United States Patent Office 2,758,998
Patented Aug. 14, 1956

2,758,998

PROCESS FOR PREPARING CITRAZINAMIDE

Abraham Bavley, Brooklyn, and Edgar K. Hamilton, Merrick, N. Y., assignors to Chas. Pfizer & Co., Inc., New York, N. Y., a corporation of Delaware No Drawing. Application October 8, 1953,
Serial No. 385,038

14 Claims. (Cl. 260—295)

This invention relates to a process for preparing citrazinamide, and more particularly, to a process for preparing citrazinamide and the ammonium salts thereof from the lower alkyl esters of citric acid.

There are a number of general methods of preparation for amides, which include heating the dry ammonium salts of organic acids, ammonolysis of acid chlorides, anhydrides, etc., and addition of water to nitriles. If these methods are applied to the preparation of citrazinamide, all of them require first the preparation of citrazinic acid before application of the method in question. Citrazinic acid, of course, can be prepared advantageously from citric acid and aqueous ammonia in accordance with the process of our copending U. S. patent application Serial No. 310,734 filed September 20, 1952, now U. S. Patent No. 2,729,647 of January 3, 1956. However, it has now been found that citrazinamide can be prepared with equal facility by treating the lower alkyl esters of citric acid with anhydrous ammonia, thereby obviating the need for preparing citrazinic acid or salts thereof before the corresponding amide is formed.

In accordance with the present invention, therefore, ammonia is reacted under anhydrous conditions with the lower alkyl esters of citric acid, the alkyl groups of the esters containing say from 1 to 4 carbon atoms. Such esters include trimethyl citrate, dimethyl citrate, monomethyl citrate, triethyl citrate, tripropyl citrate, tributyl citrate, methylethyl citrate, and the like. Mixtures of such esters can also be employed to advantage. The trialkyl esters of citric acid are preferred in view of the high order of purity of the citrazinamide obtainable therefrom; however, the mono- and di-alkyl esters are useful when the presence of citrazinic acid in the resulting product is not objectionable. Trimethyl citrate is in turn preferred for reasons of economy and because of its ease of preparation. These esters are prepared by methods well known in the art, as by refluxing citric acid with the lower alkanol corresponding to the desired ester in the presence of an acid esterification catalyst such as sulphuric acid. The esters thus prepared may be recovered and purified or they may be reacted with anhydrous ammonia in situ as hereinafter described.

The reaction between the esters and ammonia is carried out in an autoclave or other suitable pressure vessel, preferably glass lined and equipped with means for cooling, heating and agitation. As far as possible, anhydrous conditions are maintained during the course of the reaction since the presence of water tends to form citrazinic acid, with a corresponding decrease in the yield of citrazinamide. Accordingly, alcohols are employed as solvents for the reaction, preferably the lower alkanols having from 1 to 5 carbon atoms. It is unnecessary to employ an alcohol corresponding to the citric acid ester selected for the reaction, although methanol is a convenient solvent for the preferred trimethyl citrate.

The concentration of the ammonia and its ratio to the citric acid esters employed can vary considerably, but there should generally be a substantial molar excess of the former. The ammonia is conveniently introduced by saturating the alcohol therewith at a temperature of about 0° C. and under atmospheric pressure. The molar ratio of ammonia to the citric acid esters which may then be introduced to the solution can vary considerably, an amount of at least 3 mols. and as much as from 7 to 9 mols. ammonia/mol. of ester, and higher, being desirable under the appropriate circumstances.

The reaction can be conducted at a broad range of temperatures, say from 125° to 160° C., depending upon the concentration of ammonia and its ratio to the citric acid, among other factors. Temperatures in the order of 130° to 140° C. are preferred for optimum results. Superatmospheric pressure is employed to maintain the desired concentration of ammonia. In general, the higher the concentration of ammonia, the greater should be the pressure at a given reaction temperature. The pressure may, therefore, range from 100 to 500 pounds per square inch and higher, depending upon the reaction temperature and the concentration of ammonia used. It will be appreciated that the proportions of the reactants and the conditions of reaction are inter-dependent and, therefore, each may vary considerably, the dominant limiting factor being the physical capabilities of the equipment involved.

In general, the longer the reaction is conducted the greater will be the yield of citrazinamide, although a reaction period of from about 4 to 12 hours is usually adequate to obtain advantageous results. At the end of this period, any excess ammonia is removed by distillation under reduced pressure. At this point the product, which is in the form of the ammonium salt of citrazinamide, may be filtered off and washed with further alcohol. The ammonium salt can be further purified by methods well known in the art and used as such, or it may be converted to citrazinamide.

The ammonium salt of citrazinamide is readily hydrolyzed to citrazinamide by dissolving the same in water and acidifying the resulting solution, say to a pH of 1 to 3 with a suitable acid, such as sulphuric acid. A pH of about 2 is preferred for this purpose. Care should be taken to avoid high concentrations of acid in order to prevent complete hydrolysis of the desired amide. Upon acidification as described, the citrazinamide precipitates out and is readily filtered off, washed with water and dried.

In accordance with one modification of this invention, the necessary citric acid esters are first prepared and then reacted with ammonia without ever isolating the esters. In such event the water of esterification is removed prior to the treatment with ammonia. This is conveniently accomplished by withdrawing the water and alcohol vapors produced during esterification and replenishing the esterification mixture with further water-free alcohol until the final mixture is substantially anhydrous. The acid esterification catalyst is then neutralized with a suitable alkaline agent, preferably ammonia, to form the water-soluble salt thereof. For best results, the acid catalyst should be employed in low concentrations. After the water of neutralization is removed, as by distillation with further alcohol, the mixture is diluted to the desired concentration with alcohol and saturated with ammonia for the reaction above described. A considerable improvement in overall yield from citric acid is thus obtained by avoiding isolation of the ester. The subsequent hydrolysis of the resulting product to citrazinamide readily permits separation of the water-insoluble citrazinamide from the water-soluble salts resulting from neutralization of the esterification catalyst.

The invention is further illustrated by the following example which is given for illustrative purposes only and is not intended in any way to limit the invention.

Example I

Thirteen liters of methanol were cooled below 0° C. in a stainless steel vessel, 1807 grams of anhydrous ammonia were absorbed therein, and 2889 grams of trimethyl citrate were added with stirring. The resulting slurry was charged to a 5 gallon stainless steel, stirred autoclave and heated to 130° C. within a period of 1.7 hours. The charge was held at 133–135° C. for 9 hours and then allowed to cool to 45° C. within 8 hours. The pressure was observed to be 375 p. s. i. g. at 130° C., dropping to 250 p. s. i. g. within 2 hours and remaining constant for the rest of the 9 hours.

The autoclave was discharged into a glass bottle open to the atmosphere. An orange colored precipitate resulted and was filtered off and washed with methanol until the washings were light in color. The filtercake was dissolved in 22 liters of water at room temperature and the solution was acidified to pH 2.0 with sulphuric acid. The resulting yellow precipitate was filtered off, washed with water until the filtrate was light in color, and the cake was dried in vacuo at 70° C.

The light yellow-colored product weighed 1355 grams, corresponding to a 71.3% yield from trimethyl citrate. Analytical data follow:

|  | Found | Theory |
| --- | --- | --- |
|  | Percent | Percent |
| Dumas N | 17.82 | 18.18 |

Thus we have described a new and useful process for preparing citrazinamide and the ammonium salts thereof in an economical and advantageous manner. The resulting products are useful as intermediates in organic syntheses, particularly in the manufacture of various dyestuffs.

Resort may be had to such modifications and equivalents as fall within the spirit of the invention and the scope of the appended claims.

We claim:

1. A process for preparing citrazinamide which comprises reacting a lower alkyl ester of citric acid with at least 3 mols. of ammonia at an elevated temperature from about 125° to 160° C. and under substantially anhydrous conditions in the presence of a lower alkanol solvent, acidifying the resulting product, and recovering citrazinamide from the mixture thus formed.

2. A process for preparing citrazinamide which comprises reacting trimethyl citrate under substantially anhydrous conditions in methanol with a molar excess of ammonia at a temperature from about 125° to 160° C. and under superatmospheric pressure, acidifying the resulting product at a pH from about 1 to 3, and recovering citrazinamide from the mixture thus formed.

3. A process for preparing the ammonium salt of citrazinamide which comprises reacting a lower alkyl ester of citric acid with ammonia at an elevated temperature from about 125° to 160° C. and under substantially anhydrous conditions in the presence of an alcohol solvent.

4. The process of claim 3 wherein a molar excess of ammonia is employed.

5. The process of claim 3 wherein the elevated temperature is from about 130° to 140° C.

6. The process of claim 3 wherein the lower alkyl ester of citric acid is a trialkyl ester.

7. In a process of preparing citrazinamide, the step of reacting a lower alkyl ester of citric acid with ammonia at an elevated temperature from about 125° to 160° C. and under substantially anhydrous conditions in the presence of an alcohol solvent.

8. The process of claim 7 wherein a molar excess of ammonia is employed.

9. The process of claim 7 wherein the elevated temperature is from about 130° to 140° C.

10. The process of claim 7 wherein the lower alkyl ester of citric acid is a trialkyl ester.

11. A process for preparing citrazinamide which comprises reacting a lower alkyl ester of citric acid with ammonia at an elevated temperature from about 125° to 160° C. and under substantially anhydrous conditions in the presence of an alcohol solvent, acidifying the resulting product and recovering citrazinamide from the mixture thus formed.

12. The process of claim 11 wherein a molar excess of ammonia is employed.

13. The process of claim 11 wherein the elevated temperature is from about 130° to 140° C.

14. The process of claim 11 wherein the lower alkyl ester of citric acid is a trialkyl ester.

References Cited in the file of this patent

UNITED STATES PATENTS 2,728,773    Baizer ---------------- Dec. 27, 1955

OTHER REFERENCES

Behrmann: Ber. Deut. Chem., vol. 17, pp. 2681–90 (1884).

Easterfield et al.: J. Chem. Soc. (London), vol. 61, p. 1009 (1892).

Easterfield et al.: J. Chem. Soc. (London), vol. 65, pp. 28–9 (1896).

Beilstein's Handbook of Org. Chem., vol. 22, p. 257 (1935).

Ruhemann: J. Chem. Soc., vol. 51, pp. 403–9 (1887).

Ruhemann: Ber. der Deut. Chem. Gesellschaft, vol. 20, pp. 803–7 (1887).